US008935124B2

(12) United States Patent
Howell

(10) Patent No.: US 8,935,124 B2
(45) Date of Patent: Jan. 13, 2015

(54) RACE TIMING SYSTEM

(75) Inventor: Daniel R. Howell, Newburgh, IN (US)

(73) Assignee: Chronotrack Systems, Corp., Chanhassen, MN (US)

( * ) Notice: Subject to any disclaimer, the term of this patent is extended or adjusted under 35 U.S.C. 154(b) by 468 days.

(21) Appl. No.: 13/375,144

(22) PCT Filed: May 28, 2010

(86) PCT No.: PCT/US2010/036674
§ 371 (c)(1), (2), (4) Date: Nov. 29, 2011

(87) PCT Pub. No.: WO2010/138882
PCT Pub. Date: Dec. 21, 2010

(65) Prior Publication Data

US 2012/0072172 A1 Mar. 22, 2012

Related U.S. Application Data

(63) Continuation-in-part of application No. 12/732,590, filed on Mar. 26, 2010, and a continuation-in-part of application No. 12/553,369, filed on Sep. 3, 2009, now Pat. No. 8,743,661.

(60) Provisional application No. 61/182,520, filed on May 29, 2009, provisional application No. 61/182,512, filed on May 29, 2009.

(51) Int. Cl.

| | |
|---|---|
| ***G04F 1/00*** | (2006.01) |
| ***G08B 1/08*** | (2006.01) |
| ***G06F 19/00*** | (2011.01) |
| ***G07C 1/24*** | (2006.01) |

(52) U.S. Cl.
CPC ........................................ *G07C 1/24* (2013.01)
USPC ......................... 702/178; 340/539.13; 700/91

(58) Field of Classification Search
CPC ............ G07C 1/24; G07C 1/22; A63B 71/06; A63B 71/0686; A63B 2024/0025; A63B 2225/15; A63B 2225/50; A63B 24/0062; A63B 69/0028; A63B 2220/836; A63B 24/0021; A63B 2220/14; A63B 2220/62; A63B 71/0605; A43B 3/0005; G01S 19/19; G04F 8/08
USPC .......... 702/178, 150; 700/91; 340/8.1, 539.13
See application file for complete search history.

(56) References Cited

U.S. PATENT DOCUMENTS

| | | | |
|---|---|---|---|
| 5,812,049 | A | 9/1998 | Uzi |
| 7,327,251 | B2 | 2/2008 | Corbett, Jr. |

(Continued)

FOREIGN PATENT DOCUMENTS

| | | | |
|---|---|---|---|
| WO | W02004104961 | A1 | 12/2004 |
| WO | WO 2004104961 | A1 * | 12/2004 |

OTHER PUBLICATIONS

Impinj, RFID Case Study: Los Angeles Marathon, 2008, 4 pp.*

*Primary Examiner* — Toan Le
(74) *Attorney, Agent, or Firm* — C. Richard Martin

(57) ABSTRACT

An electronic timing system is provided for timing of athletic events including a radio-frequency identification antenna, a portable timing controller, a remote server, and a radio-frequency identification timing tag. The portable timing controller includes one or more radio-frequency identification readers, and a touch-panel computer electrically coupled to the one or more readers to manage data coming into the one or more readers. The controller further includes a first input/output device for exchanging data with the radio-frequency identification antenna, and a second input/output device for exchanging data with a remote server. The controller also may be powered by portable, user replaceable lithium-ion batteries. The radio-frequency identification timing tag is configured for attachment to an athlete. The timing tag and antenna are adapted for wirelessly communicating data between one another.

21 Claims, 11 Drawing Sheets

(56) References Cited

U.S. PATENT DOCUMENTS

| | | | |
|---|---|---|---|
| 7,455,217 | B2 | 11/2008 | Taylor et al. |
| 2001/0054878 | A1 | 12/2001 | Odaohhara |
| 2006/0097847 | A1 | 5/2006 | Beervoets et al. |
| 2006/0217232 | A1 | 9/2006 | Kondrat et al. |
| 2007/0135243 | A1 | 6/2007 | LaRue et al. |
| 2007/0213126 | A1 | 9/2007 | Deutsch et al. |
| 2008/0074954 | A1 | 3/2008 | Moritani |
| 2008/0146265 | A1 | 6/2008 | Valvani |
| 2008/0269017 | A1 | 10/2008 | Ungari |
| 2010/0302910 | A1 * | 12/2010 | Howell ........................... 368/10 |
| 2011/0233282 | A1 * | 9/2011 | Howell ......................... 235/492 |

* cited by examiner

FIGURE 13
CHRONOTRACK
SYSTEMS
1234
www.chronotrack.com
214
212
210

RACE TIMING SYSTEM

CROSS REFERENCE TO RELATED PATENT APPLICATIONS

The present patent application is a National Stage entry under 35 U.S.C. §371 of International Patent Application Serial No. PCT/US2010/036674 filed May 28, 2010, which claims the benefit of U.S. Provisional Application Ser. No. 61/182,520 filed May 29, 2009. International Patent Application Serial No. PCT/US2010/036674 filed May 28, 2010 is also a continuation-in-part of U.S. patent application Ser. No. 12/732,590 filed Mar. 26, 2010, and is also a continuation-in-part of U.S. patent application Ser. No. 12/553,369 filed Sep. 3, 2009, which claims the benefit of U.S. Provisional Application Ser. No. 61/182,512 filed May 29, 2009.

TECHNICAL FIELD

The invention relates to electronic timing systems used for timing of endurance athletes competing in races, and specifically relates to an improved timing system utilizing a portable controller, a RFID antenna, a disposable UHF RFID tag that is attached to the athlete, and remote server software.

Technical Problem

The human spirit is competitive. Since earliest times men and women have run and raced against each other. The basic race consists of a start where someone says "GO" and everyone races to the finish line—first one across wins. A stopwatch can be used to determine the winning time.

It is easy to spot the winners—they are at the front, but it is not so simple to determine who is say "400$^{th}$". Today, every runner wants to know how he or she did compared to other runners and to their "personal best" time. They want to know if they are "400$^{th}$" or "401$^{st}$". To know that, an accurate, recorded time needs to be generated for every runner.

In a large race today, there are thousands of runners. Systems need to capture a start-time for every runner and to track when they cross the finish line, then use that data to compute that runner's elapsed time. In long races, runners also want to know what their "split times" are. They want to know what their times were when they crossed certain mile markers during the race. Further sophistication now requires that these times be posted on the internet in real time so that relatives and loved ones can use the runner's number to see when their runner passed these points.

Technical Solution

The present invention meets that need with an improved UHF RFID timing system comprising an RFID antenna that is placed on the race course and connected to the portable controller via the cellular network. An RFID tag on the runner's shoe communicates with the RFID antenna to transmit data on the runner to the portable controller.

RFID has been used in race timing systems since 1986. Before the present invention, all of these systems used a returnable RFID chip that was attached to the runner and had to be returned to the timer following the race. These systems have significant limitations. First, the timer must build a cross-link file that correlates the unique RFID chip number to the runner's bib number. This process of building this file is time consuming and error prone. Second, after the race, each runner must wait in line to have his or her RFID chip "clipped" and returned to the timer. The event coordinator must ensure that there are sufficient volunteers to collect these RFID chips and there must be a sufficiently large and secure area to support this chip collection. If chips are not returned, the event is liable and must pay the timer for lost chips. In addition, the prior art chips are bulky and expensive to mail, so pre-registration options to improve race starts cost the event money—a not insignificant trade off. Further, the RFID controller on prior art systems is susceptible to electromagnetic interferences and must be tuned. Finally, the prior art chip controller does not have an integrated screen requiring this unit to operate externally with cables, more pieces, more packing and unpacking for the timer.

The present invention overcomes these limitations by providing a system that uses low cost, disposable UHF Gen 2 RFID Tags. The use of this tag eliminates the need for chip assignment, the cost of shipping chips to events or participants, lost chip costs and the need to create a secure zone for chip collection. The elimination of the costs for these processes directly affects the events' and timers' bottom lines. On race day, the timer can now benefit from a system that is over 99.8% accurate, does not have to be tuned, does not suffer from interference from spurious EMI sources, can be powered by its internal Li-ion batteries, external car batteries, AC generators and/or AC socket in the back of a vehicle.

Advantageous Effects

The present invention provides an all-weather option that is better suited to the logistics and pace of today's style of events. The present invention includes four primary components: the controller, the RFID antenna, the timing tag, and the remote server software.

According to one aspect of the present invention, there is provided an electronic timing system for timing of athletic events including a radio-frequency identification antenna, a portable timing controller, a remote server, and a radio-frequency identification timing tag. The portable timing controller includes one or more radio-frequency identification readers, and a touch-panel computer electrically coupled to the one or more readers to manage data coming into said one or more readers. The controller further includes first input/output means for exchanging data with said radio-frequency identification antenna, and second input/output means for exchanging data with a remote server. The radio-frequency identification timing tag is configured for attachment to an athlete. The timing tag and antenna include means for wirelessly communicating data between one another.

According to a further aspect of the invention, the portable timing controller includes a power control board for accepting and managing electrical power from multiple sources. The multiple power sources include two or more of alternating current, direct current or battery, and preferably include all three sources. The alternating current source is preferably 110-220 volt AC house current, the direct current source preferably includes means for connecting the power control board to an external DC battery, and the battery power source may include one or more internal lithium-ion batteries. The power control board is programmed to charge the battery power source when it is using the alternating current power source. There is also provided means for providing visual and/or audio warnings when the remaining power left in the battery power source is low.

According to another aspect of the invention, the battery power source includes one or more removable lithium-ion batteries. The portable timing controller may include one or more, preferably two, sockets for removably connecting one or more removable lithium-ion batteries. The power control board according to this aspect of the invention discharges the one or more removable lithium-ion batteries serially.

According to yet a further aspect of the invention, the portable timing controller includes a built-in global positioning system that communicates with GPS satellites to determine the controller's location and time of day to the nearest $100^{th}$ of a second.

A further aspect of the invention provides that the portable timing controller includes one or more input/output devices for communicating data from the controller to other remote devices. The one or more input/output devices may include a built in Ethernet hub having one or more external Ethernet ports for attaching the controller to a network. Alternatively, or in addition to the Ethernet, the one or more input/output devices may include a cellular modem, a built-in wireless radio transmitter for transmitting data to a wireless network, and/or one or more USB ports.

According to a further aspect of the invention, the timing tag may include a printed radio-frequency identification circuit on a surface thereof for transmitting and receiving data to and from the one or more radio-frequency identification readers.

Yet a further aspect of the present invention provides that the radio-frequency identification antenna is housed within a rubberized shell that encases the antenna and allows the routing of cables. The rubberized shell includes one or more projections at a first end thereof and one or more indentations at a second end thereof, said projections and indentations corresponding in shape to permit two or more rubberized shells containing antennae to be linked together in a line.

The first input/output means for exchanging data between the controller and the radio-frequency identification antenna may, according to another aspect of the invention, include means for exchanging data between the controller and two or more radio-frequency identification antennae. The first input/output means for exchanging data between the controller and the radio-frequency identification antenna includes means for exchanging data between the controller and eight radio-frequency identification antennae.

According to one configuration, the controller may be directly connected to four radio-frequency identification antennae, and each one of said four radio-frequency antennae are connected serially to another radio-frequency antenna. An alternate configuration provides that the controller is directly connected to two radio-frequency identification antennae, and each one of said four radio-frequency antennae are connected serially to an additional three radio-frequency antennae. A further configuration provides the controller is directly connected to a radio-frequency identification antenna, and said radio-frequency antenna is connected serially to additional seven radio-frequency antennae.

Accordingly, it is an object of the present invention to provide a low cost, portable, configurable timing system that eliminates the need for chip assignment, the cost of shipping chips to events or participants, lost chip costs and the need to create a secure zone for chip collection. It is a further object of the invention to provide a portable timing system with removable batteries to aid in transport of the system and recharging of the batteries.

These and other objects, features and advantages of the present invention will become apparent with reference to the text and the drawings of this application.

BEST MODE

Figure 1:
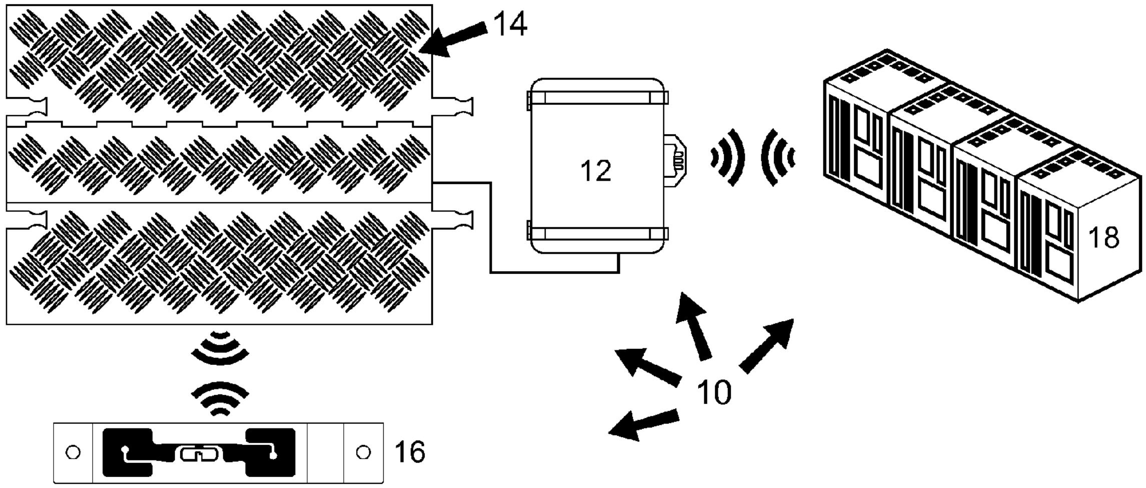
FIG. 1 is a schematic diagram showing the primary components of the present invention according to a presently preferred embodiment.
Figure 2:
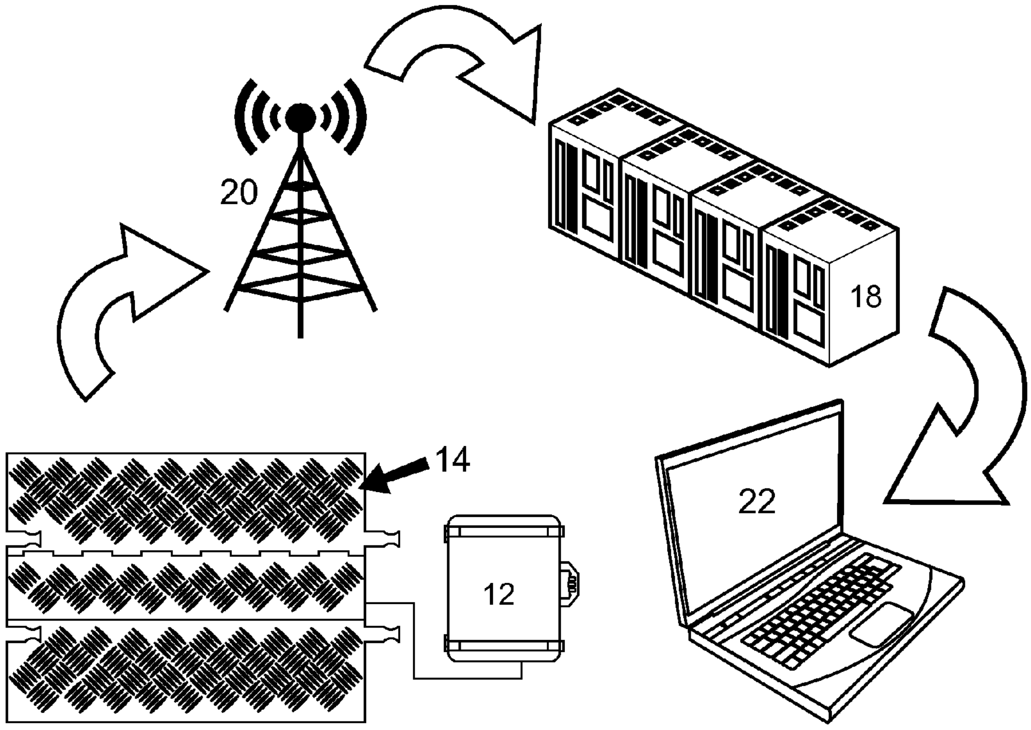
FIG. 2 is schematic diagram showing the primary components of the present invention according to another presently preferred embodiment.

The present invention is an improved race timing system 10. As shown in FIG. 1, the timing system 10 includes four primary components: a controller 12, an RFID antenna 14, a timing tag 16, and a remote server 18. The remote server 18 and associated software collects timing data from any race point where a RFID antenna 14 and controller 12 are located using several different methodologies and delivers this data to the timer so that he/she can quickly and efficiently score the race. FIG. 2 depicts how timing data collected from the RFID antenna 14 is passed to the controller 12, which in turn sends it to the remote system server 18 via a communication link using, for example a cell phone tower 20. The system server 18 formats and filters this data and delivers it to the timers scoring package, via any accessible internet link. This enables timers to score races remotely—that is, they use non-skilled employees to lay out the timing equipment at the race site and, using the GPRS cell capabilities built into each controller 12, the data is sent to the timer who scores the race from their office and using a laptop computer 22 with printer attached (not shown) that prints the results back to the race site remotely.

Figure 3:
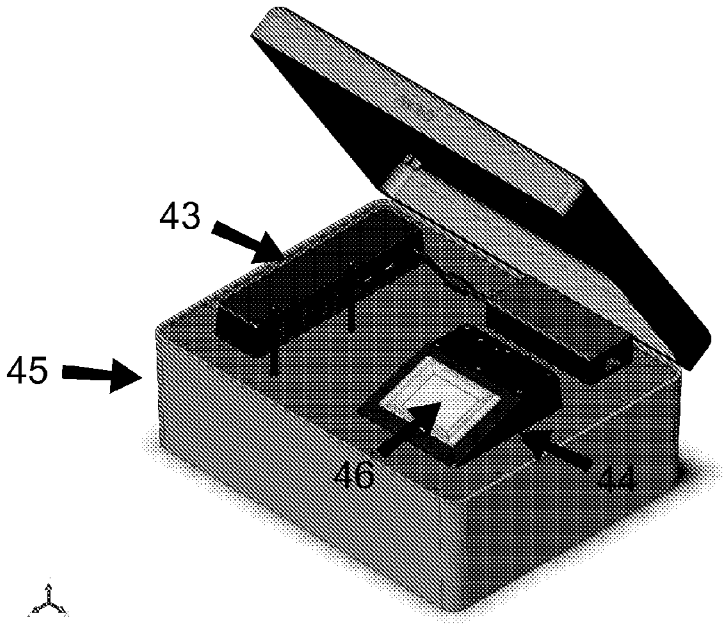
FIG. 3 is a perspective view of the controller for the improved timing system of the present invention.
Figure 4:
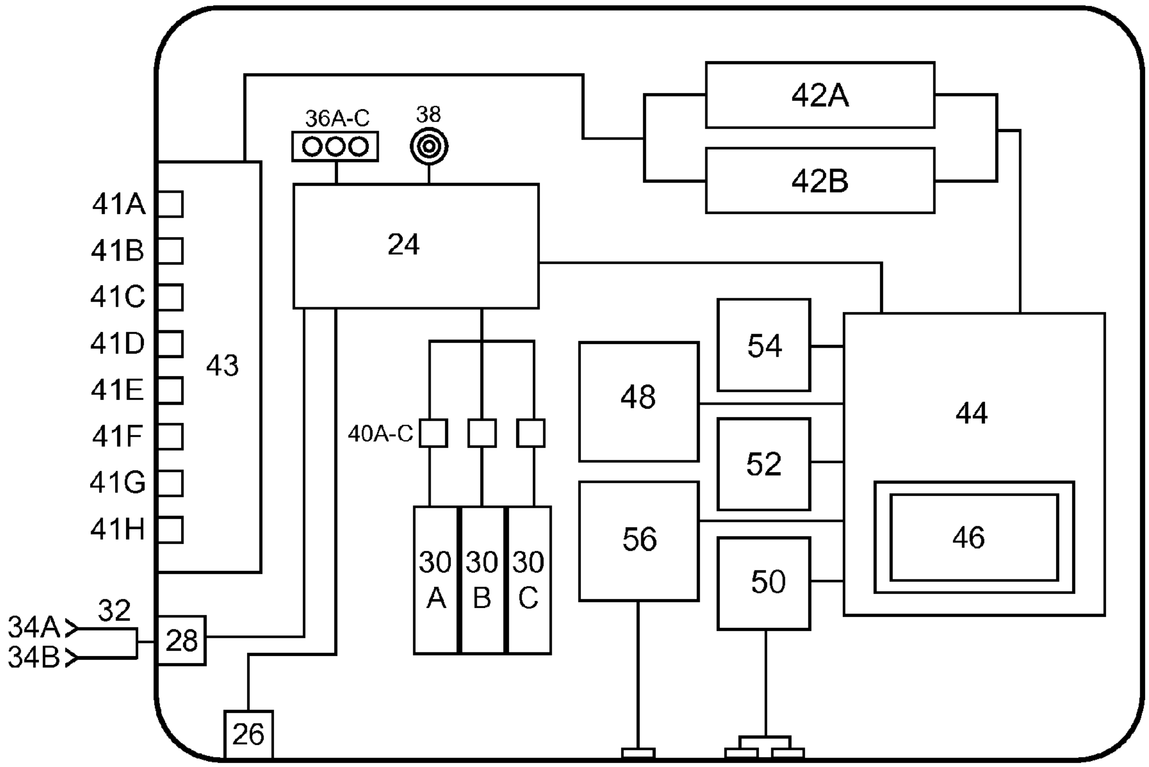
FIG. 4 is a schematic view of the controller for the improved timing system of the present invention.

According to a presently preferred embodiment of the invention, the controller 12 is a self-contained mobile Gen2 UHF RFID reader system. As shown in FIG. 3 and FIG. 4, the controller 12 includes intelligent power management in the form of a power control board 24 that will accept and manage electrical power from multiple sources, including 110-220 volt AC 26, 12 volt DC 28, and batteries 30*a*, 30*b*, 30*c*. When used in the AC mode, the controller is capable of accepting normal house current or, the controller includes sufficient filter logic to accept dirty power from a portable AC generator. The controller 12 also includes an external battery connector 32 that permits banana clips 34*a*, 34*b* to be used to connect a 12 volt car battery (not shown). Alternatively, instead of banana clips 34*a*, 34*b*, the external battery connector may comprise an automobile cigarette lighter adapter (not shown). The controller 12 may also include up to three internal Lithium Ion batteries 30*a*, 30*b*, 30*c* that will power the controller for up to 18 hours between charges.

The power control board 24 has been designed to recognize what power source is connected. When connected to AC 26, the power control board 24 will provide power to the controller 12 and charge the internal batteries 30*a*, 30*b*, 30*c*. When connected to external DC power 28, the power control board 24 only provides power to the controller 12 but does not attempt to charge the batteries 30*a*, 30*b*, 30*c*. The power control board 24 drives one or more, preferably three LEDs 36*a*, 36*b*, 36*c* to indicate battery levels and further sounds an audible alarm 38 when the power level is critically low. Each battery 30*a*, 30*b*, 30*c* also contains its own power management board 40*a*, 40*b*, 40*c*, respectively, that prevents the batteries 30*a*, 30*b*, 30*c* from being overcharged or damaged by being fully discharged or short circuited.

Internally, the controller 12 utilizes one or more, preferably two, RFID readers 42*a*, 42*b*. These readers may be standard off-the-shelf RFID readers such as the Speedway® RFID Reader manufactured by Impinj®, and are capable of reading 650 RFID tags 16 per second. A proprietary application has been embedded onto the readers to filter the enormous amount of data they are capable of collecting and further to format and present the data in such a fashion that it can be used in a timing environment. The RFID antenna port 41*a*-41*h* from these readers 42*a*, 42*b* are piped to the output mesa 43 on the controller 12 where quick connect connectors are used to connect up to 8 RFID antenna 16*a*-16*h* to the controller 12.

The controller 12 utilizes a Windows CE portable computer 44 including a touch panel screen 46 to manage all data coming from the RFID readers 42*a*, 42*b* and to forward this data to the various Input/Output devices attached to the controller 12. The touch panel 46 on the computer 44 is used to configure the controller 12 for all the differing timing scenarios it may be required to support. The controller 12 has a built-in Global Positioning System (GPS) 48 that communicates with GPS satellites to determine its location and time of day to the nearest $100^{th}$ of a second. This clock is used to accurately synchronize the time on all the controllers being used to time a race. Finally, the controller utilizes multiple I/O methodologies and devices including Ethernet, cellular modem, WiFi and USB ports to communicate data. The controller 12 has a built in Ethernet hub 50 with two external Ethernet ports 51*a*, 51*b*. The touch panel computer 44 and RFID readers 42*a*, 42*b* are IP addressable and can be configured using the touch panel computer 44 touch panel screen 46. The Ethernet ports 51*a*, 51*b* can be used to attach the controller 12 to any network following the appropriate configuration steps. The controller 12 also includes a built in cellular modem 52 that can be used to send and receive data to/from any server residing on the internet. As shown in FIG. 2, this modem 52 is used to send timing data to a system server 18 from remote locations where it is not feasible to use Ethernet or WiFi. The controller 12 also has a built-in 802.11 a/b/g wireless radio (WiFi) 54 to send and receive data to any WiFi network appropriately configured. The traditional use for this device is to allow a timer to wirelessly communicate to a controller 12 from his or her laptop computer 22. Finally, timing data can be manually removed from the controller plugging USB memory sticks into one or more USB ports 56 built into the controller 12. USB memory sticks can also be used to load application upgrades to both the touch panel computer 44 and the RFID readers 42*a*, 42*b*. The controller components are housed in a portable carry case 45 that can be equipped with a handle to aid in carrying.

Figure 5:
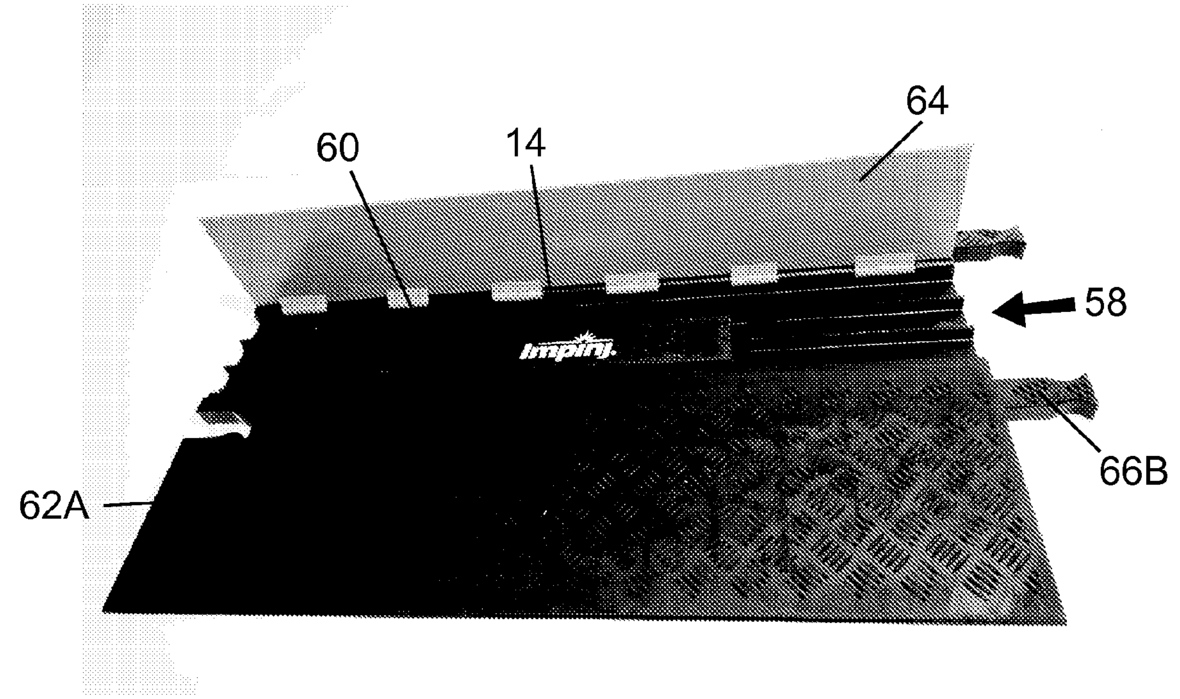
FIG. 5 is a perspective view of the RFID antenna and skin for the improved timing system of the present invention.
Figure 6:
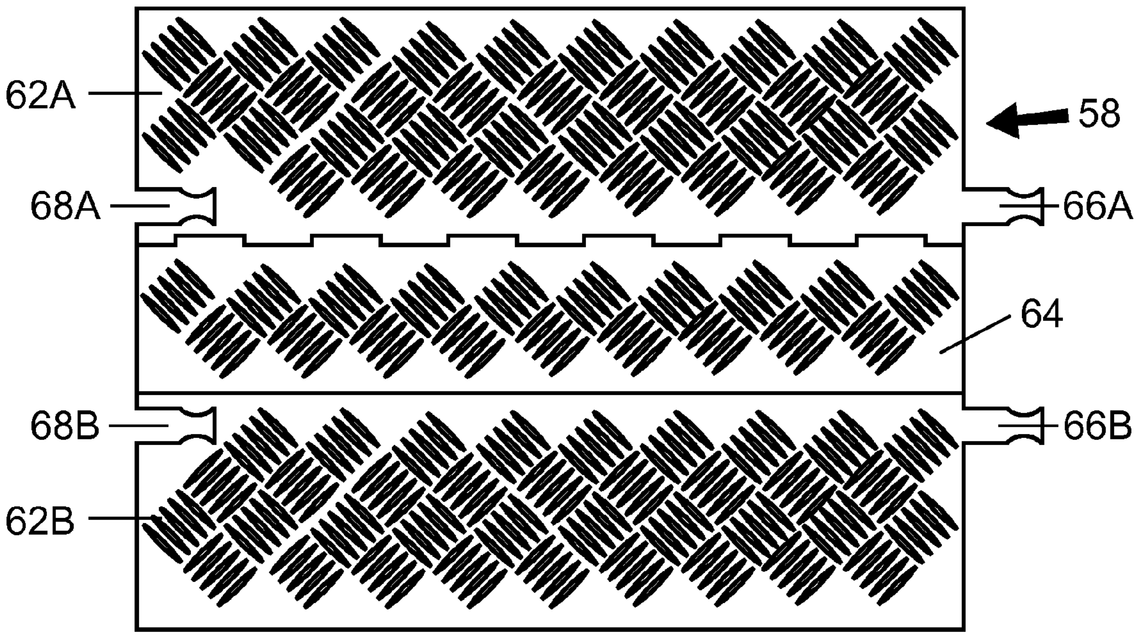
FIG. 6 is a top plan view of the skin shown in FIG. 5.

As best shown in FIG. 5, the RFID antenna 14 is housed within a rubberized shell ("skin") 58 that encases the antenna 14 and allows the routing of cables to subsequent antennae 14*b*, 14*c*, . . . in the line. The antenna 14 is tuned to only operate correctly when inserted into the skin 58, and the reader 42 will not recognize that an antenna is attached when it is not properly inserted in the skin 58. The skin 58 includes a central hollow section 60 for receiving the RFID antenna 14 and cabling for connecting the RFID antenna 14 to the controller and/or to additional RFID antennae. Sloped side sections 62*a*, 62*b* are connected to the lengthwise ends of the central section 60 to create a gradual slope leading up to the raised center section 60. A hinged cover 64 to the central section 60 is provided to facilitate insertion of the RFID antenna 14 and cabling. The dimensions of the skin 58 and the slope of the end sections 62*a*, 62*b* are designed to be ADA compliant, and preferably the skin 58 is approximately 42" L×31.5" W and is 1" H at the central section 60. Each respective skin (e.g. 58*a*) is configured to be interlockingly attached to another skin (e.g. 58*b*) by projections 66*a*, 66*b* that are provided in one end of each respective end section 62*a*, 62*b* and corresponding indentations 68*a*, 68*b* provided in the other end of each respective end section 62*a*, 62*b* of the skin 58. The ends of multiple skins may be linked together form timing lines as shown in FIGS. 7-10. These lines, when connected to a controller 12, can detect when timing tags 16 cross them and assign a time to when this event occurs. One controller 12 can support a line from 42 inches (a single RFID antenna 14 and skin 58) to 28 feet (eight RFID antennae and skins).

Figure 7:
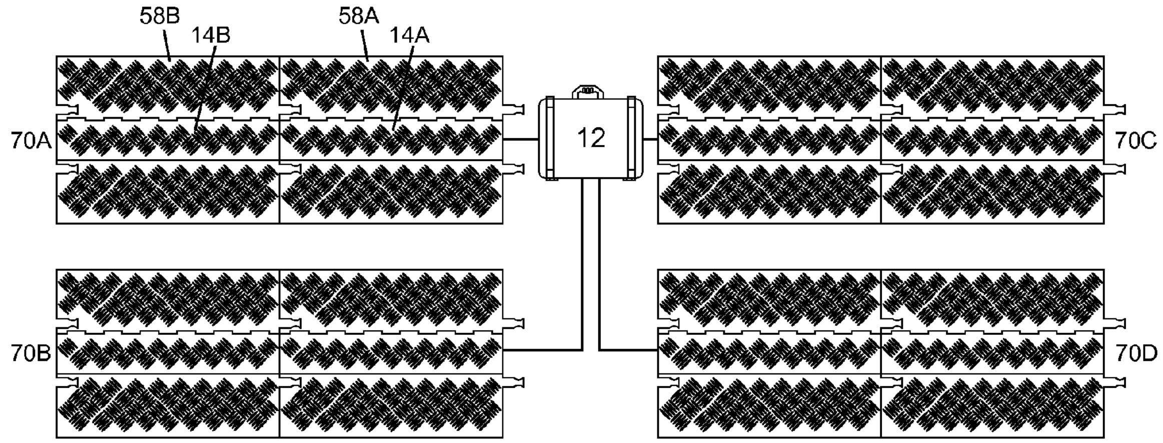
FIG. 7 shows a layout configuration for a controller and RFID antennae for a particular application, in this case a triathlon.
Figure 8:
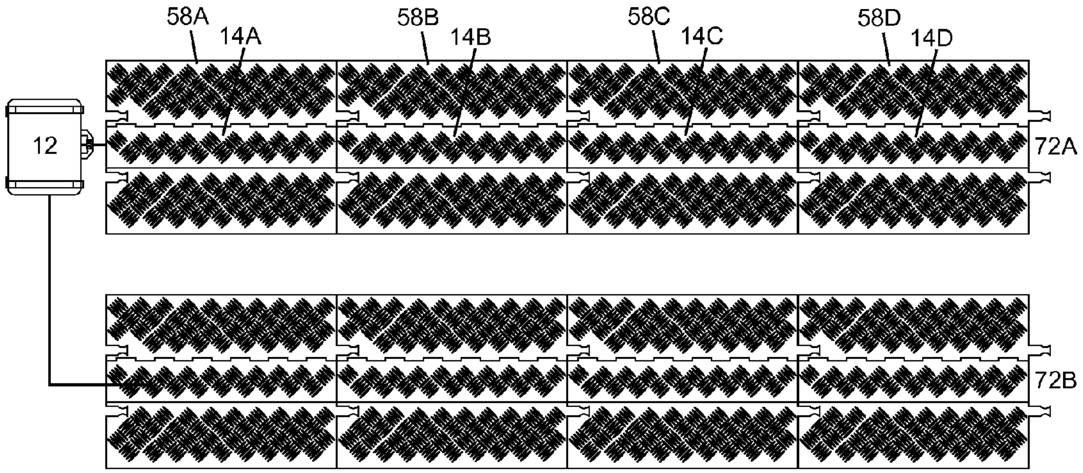
FIG. 8 shows a layout configuration for a controller and RFID antennae for a particular application, in this case a small race start or finish configuration.
Figure 9:
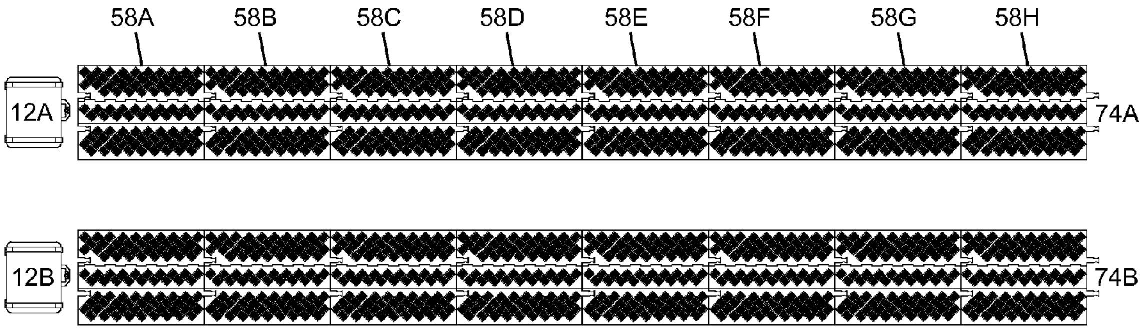
FIG. 9 shows a layout configuration for a controller and RFID antennae for a particular application, in this case a medium race start or finish configuration.
Figure 10:
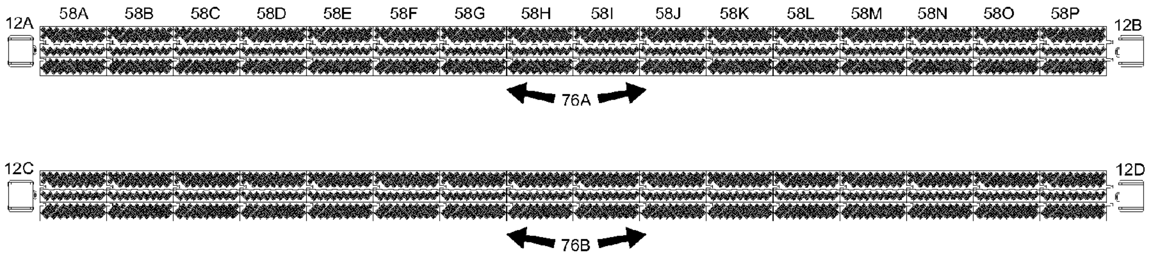
FIG. 10 shows a layout configuration for a controller and RFID antennae for a particular application, in this case a large race start or finish configuration.

As shown in FIGS. 7-10, Controllers 12 and skins 58 enclosing the RFID antennas 14 can be set out in a multitude of configurations. FIG. 7 shows a traditional triathlon configuration including four (4) seven foot lines (swim in primary 70*a*, swim in secondary 70*b*, bike out primary 70*c*, bike out secondary 70*d*), respectively, connected to a single controller 12. Each line 70*a*, 70*b*, 70*c*, 70*d* includes two skins 58*a*, 58*b*, with two corresponding RFID antennae 14*a*, 14*b*, respectively. FIG. 8 shows a traditional small race start or finish configuration including two (2) fourteen foot lines (one primary line 72*a*, and one backup line 72*b*). Each line 72*a*, 72*b* includes four skins 58*a*, 58*b*, 58*c*, 58*d* with four corresponding RFID antennae 14*a*, 14*b*, 14*c*, 14*d*, respectively. A single 8-port controller 12 is connected to both the primary line 72*a* and secondary line 72*b*. FIG. 9 shows a traditional medium race start or finish configuration including two (2) twenty eight foot lines—one primary line 74*a* and one backup line 74*b*. Each line 74*a*, 74*b* includes eight skins 58*a*, 58*b*, 58*c*, 58*d*, 58*e*, 58*f*, 58*g*, 58*h* with eight corresponding RFID antennae 14*a*, 14*b*, 14*c*, 14*d*, 14*e*, 14*f*, 14*g*, 14*h*, respectively. One 8-port controller 12*a* is connected to the primary line 72*a* and a second 8-port controller 12*b* is connected to the secondary line 72*b*. FIG. 10 shows a traditional large race start or finish configuration including two (2) fifty six foot lines—one primary line 76*a* and one backup line 76*b*. Each line 76*a*, 76*b* includes sixteen skins 58*a*, 58*b*, 58*c*, 58*d*, 58*e*, 58*f*, 58*g*, 58*h*, 58*i*, 58*j*, 58*k*, 58*l*, 58*m*, 58*n*, 58*o*, 58*p* with sixteen corresponding RFID antennae 14*a*, 14*b*, 14*c*, 14*d*, 14*e*, 14*f*, 14*g*, 14*h*, 14*i*, 14*j*, 14*k*, 14*l*, 14*m*, 14*n*, 14*o*, 14*p*, respectively. Two 8-port controllers 12*a*, 12*b* are connected to the primary line 76*a*, with the first controller 12*a* being connected to the first eight skins 58*a*, 58*b*, 58*c*, 58*d*, 58*e*, 58*f*, 58*g*, 58*h*, and a second controller 12*b* being connected to the second eight skins 58*i*, 58*j*, 58*k*, 58*l*, 58*m*, 58*n*, 58*o*, 58*p*. Similarly, two 8-port controllers 12*c*, 12*d* are connected to the secondary line 76*b*, with the third controller 12*c* being connected to the first eight skins 58*a*, 58*b*, 58*c*, 58*d*, 58*e*, 58*f*, 58*g*, 58*h*, and a fourth controller 12*d* being connected to the second eight skins 58*i*, 58*j*, 58*k*, 58*l*, 58*m*, 58*n*, 58*o*, 58*p*.

Figure 11:
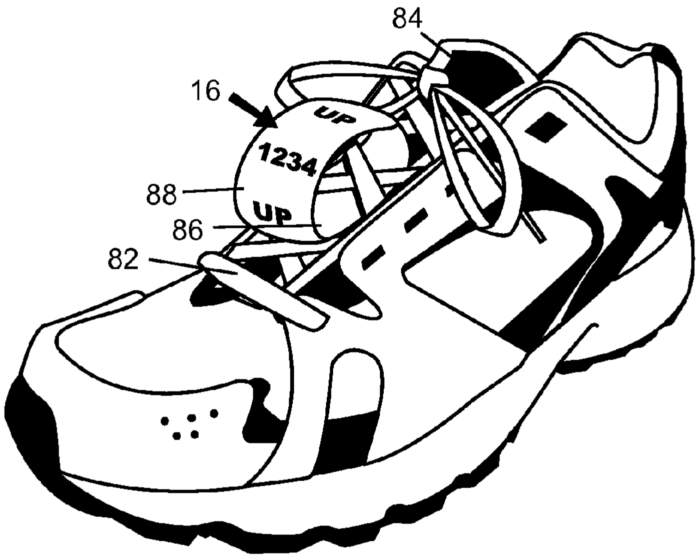
FIG. 11 is a perspective view of an athletic shoe having an assembled improved timing tag according to a preferred embodiment of the present invention attached thereto via the laces.
Figure 12:
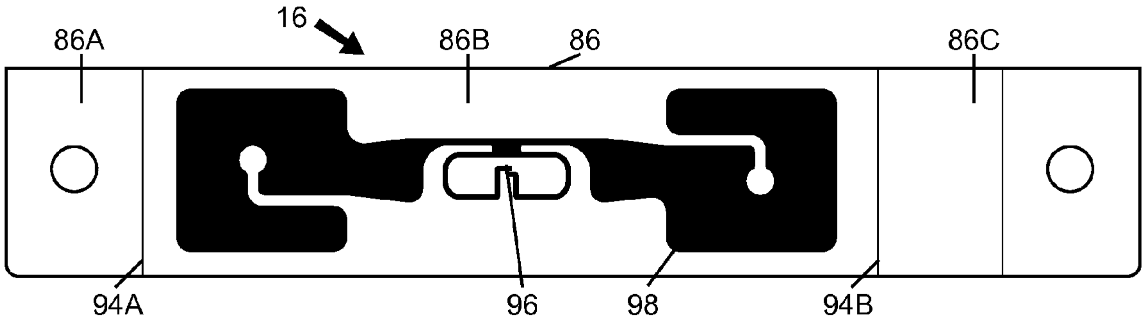
FIG. 12 is a back plan view of an unassembled improved timing tag according to a preferred embodiment of the present invention.

FIG. 11 and FIG. 12 illustrate one presently preferred embodiment of the RFID timing tag 16. As shown in FIG. 11, the timing tag 16 is preferably attached to an athletic shoe 80 by inserting a portion of the timing tag 16 between the laces 82 and tongue 84 of the athletic shoe 80, such that the tag forms a substantially D-shaped profile. According to the presently preferred embodiment, the timing tag 16 is a planar member, preferably having a substantially rectangular cross-section. Although other dimensions are contemplated, the timing tag according to the preferred embodiment is approximately 1.25 inches (3 cm) wide to permit insertion between the laces 82 and tongue 84 of a common athletic shoe 80, and 6.25 inches (16 cm) long. The timing tag 16 is preferably formed of a flexible, water resistant sheet type material having very low conductivity, such as sheet plastic or laminated paper. The timing tag 16 includes opposing rear and front surfaces 86 and 88, respectively.

As best shown in FIG. 12, the planar timing tag 16 of the present invention is removably attached to a disposable planar member 90. The rear surface 86 of the timing tag 16 includes three separate sections 86*a*, 86*b*, 86*c* separated by fold lines or creases 94*a*, 94*b* extending across the timing tag 16. An integrated circuit 96 and antenna 98 are formed on the timing tag 16. Further details of the RFID timing tag are discussed in co-pending U.S. Provisional Patent Application Ser. No. 61/182,512, and need not be discussed in further detail here.

Figure 13:
FIG. 13 is front plan view of a race bib timing device according to one preferred embodiment of the present invention.
Figure 14:
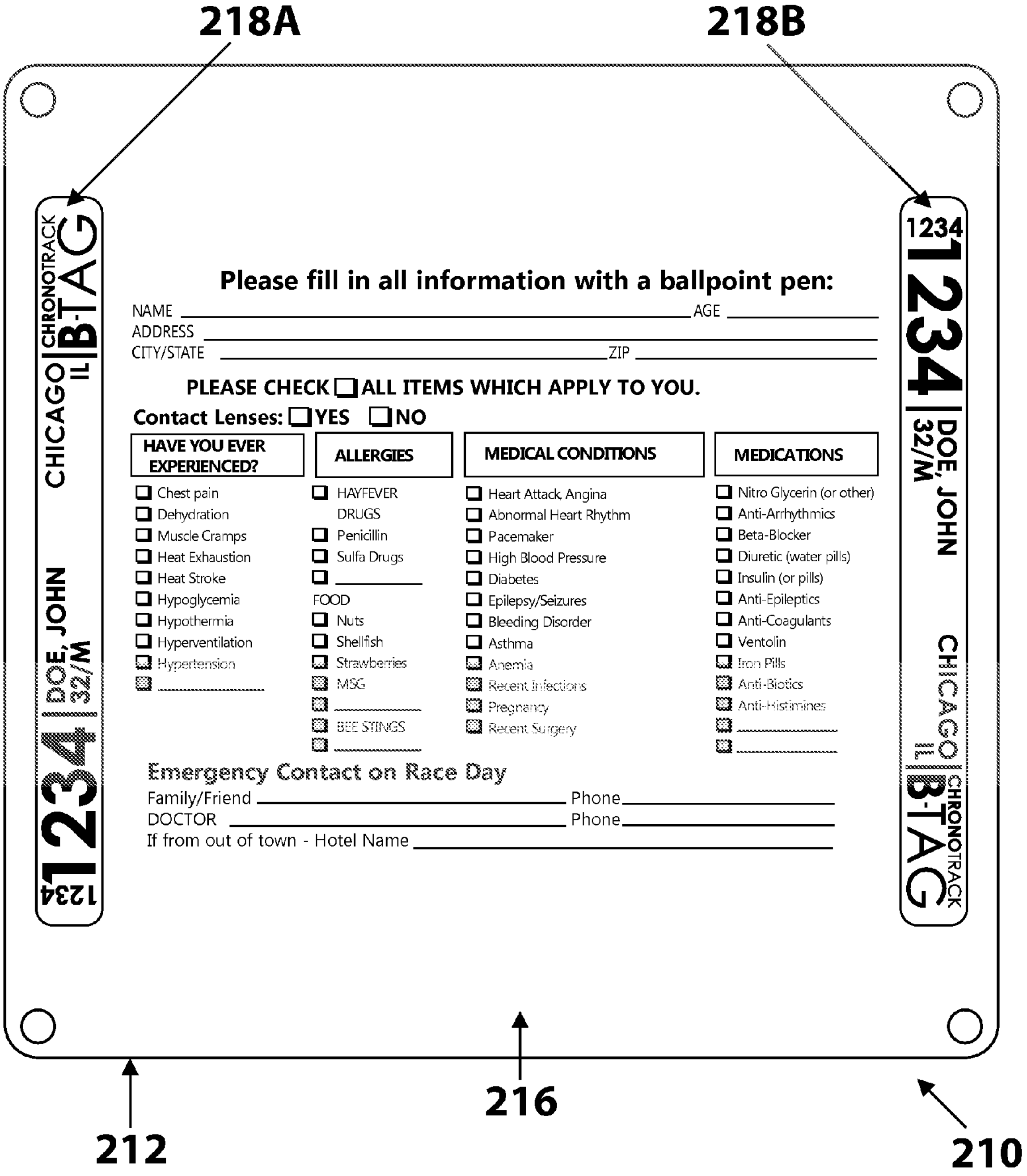
FIG. 14 is a rear plan view of the race bib timing device shown in FIG. 13.
Figure 15:
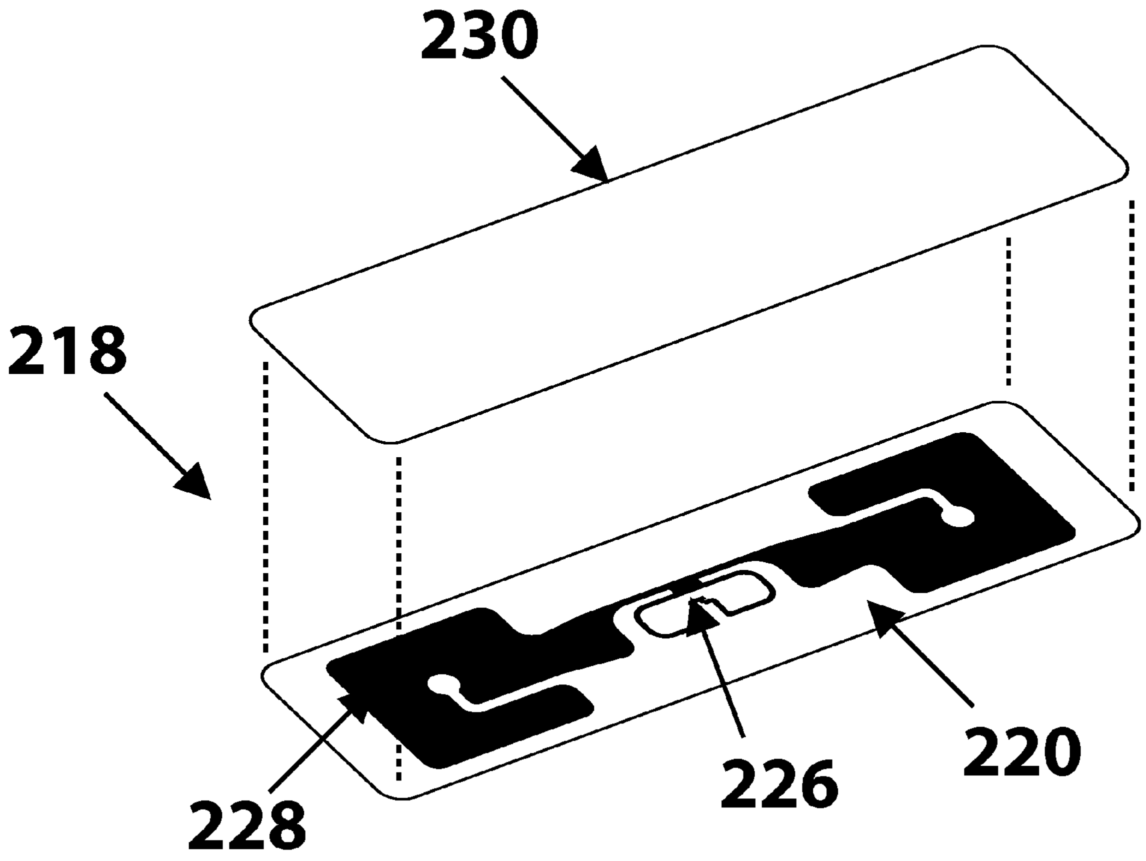
FIG. 15 is an exploded perspective view of one of the timing tags of the race bib timing device shown in FIGS. 13 and 14.

FIGS. 13-15 illustrate an alternative presently preferred embodiment of the RFID timing tag. As shown in FIG. 13 According to the presently preferred embodiment, the timing tag includes a race bib 212, having a front surface 214 and a rear surface 216. A pair of spaced apart parallel timing tags 218*a*, 218*b* are associated with the race bib 212 for obtaining timing information about the participant when used in conjunction with the race timing system and readers of the present invention. The timing tags 218*a*, 218*b* are positioned such that the antennae 228 therein are linearly polarized relative to one another, and are positioned on the race bib 212 such that, when the bib is affixed to the garment of the participant, the timing tags 218*a*, 218*b* are oriented such that they are perpendicular to the tag reader. A protective layer or coating 230 is located between the timing tag 218 and the participant. According to one presently preferred embodiment, the protective layer or coating 230 is a product known as RFIDefend produced by MPI Label Systems. The RFIDefend has a unique and proprietary material construction that provides added protection to the inlay in applications where the RFID tag is subjected to impact, abrasion, heat or moisture. It also allows the entire label to be printed without quality interference from the chip and withstands exposure to outdoor elements. Further details of the RFID bib tag are discussed in co-pending U.S. patent application Ser. No. 12/732,590 and need not be discussed in further detail here.

The antenna 88 picks up signals from the RFID reader 42*a*, 42*b* or scanner and then returns the signal, with some additional data—in this case, the runner's bib number and related information that has previously been encoded on the memory circuits of the integrated circuit 86.

Figure 16:
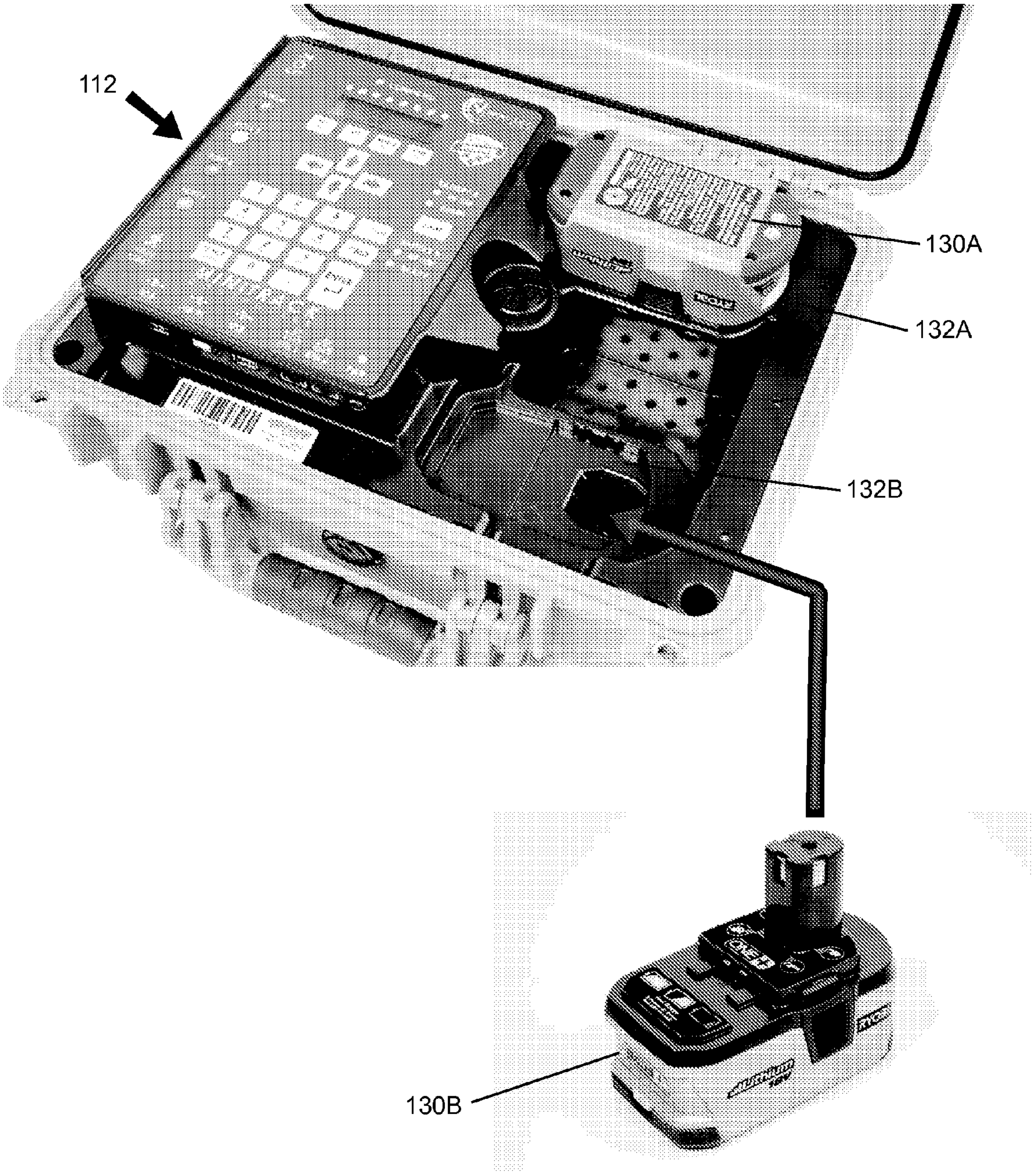
FIG. 16 is a perspective view of an alternative embodiment of a controller for the improved timing system of the present invention.
Figure 17:
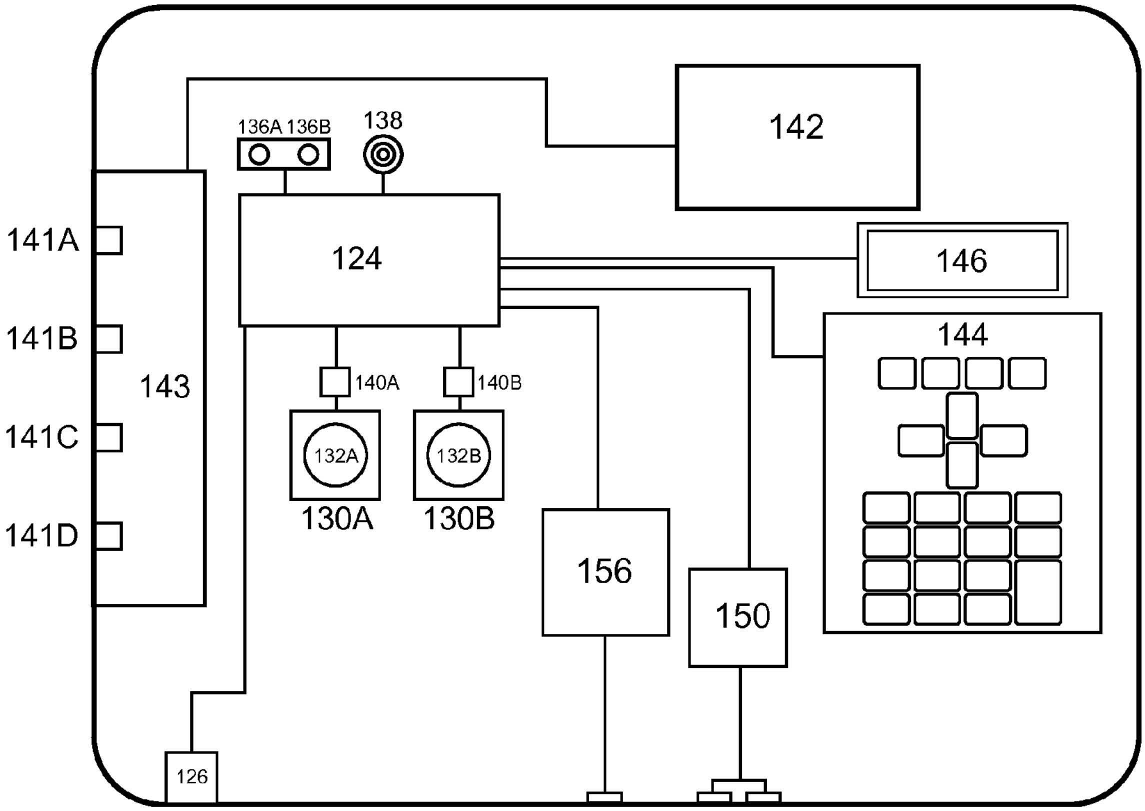
FIG. 17 is a schematic view of the alternative embodiment controller of FIG. 16.

A controller 112 according to an alternative embodiment of the present invention is shown in FIG. 16 and FIG. 17. The alternative embodiment controller 112 is a self-contained mobile Gen2 UHF RFID reader system, and is similar to the controller 12 shown in FIG. 3 and FIG. 4, wherein like reference numerals indicate like components. The controller 112 includes intelligent power management in the form of a power control board 124 that will accept and manage electrical power from multiple sources, including removable batteries 130*a*, 130*b*.

In use, it has proven difficult to transport the controller 12 to distant races due to the internal lithium-ion batteries. On Jan. 1, 2008, the FAA issued new restrictions on travelling with devices having internal lithium-ion batteries. In essence, the FAA now forbids the transport of any lithium-ion battery rated over 300 watt-hours (25 g ELC) on commercial flights. Restrictions have also been imposed on air shipment of lithium-ion batteries making it difficult to transport the internal battery controller 12 via air for races.

To overcome these restrictions, a controller 112 is provided having one or more removable lithium-ion batteries 130*a*, 130*b*. The batteries 130*a*, 130*b* can be removably inserted into corresponding sockets 132*a*, 132*b* to power the controller 112. In use, the batteries discharge serially, such that, for example, the first battery 130*a*, powers the controller until it nears the end of its charge. At or near the end of its charge, the power control board 124 switches to the second battery 130*b*. An LED signal 136*a* is displayed to the operator to indicate that the first battery is depleted and ready for recharging. With a total of three batteries, and a remote recharger, the controller can operate continuously without interruption. While one battery 130*a* is powering the controller 112, a second fully charged battery 130*b* is plugged into the socket 132*b* and awaiting use. A third battery (not shown) may be charging on a remote charger (also not shown). When the first battery is discharged, it is removed from the socket 132*a* and placed on the charger. The third battery that was charging may now be placed in the socket 132*a*, and will be ready for use when the second battery 130*b* is discharged.

To further assist the end user of the controller, the sockets 132*a*, 132*b* may be configured to receive commercially available rechargeable lithium-ion batteries, such as those commonly used to power cordless power tools. For example, the sockets 132*a*, 132*b* could be configured to receive a commercially available Ryobi One+™ 18V Lithium-Ion Battery that is commercially available in retail hardware stores. The controller 112 could be shipped for a race or transported by commercial airline to the race without regard to restrictions on the transport of lithium-ion batteries. At the race location, the operator could just purchase two or more, preferably three, compatible lithium-ion batteries for use with the controller.

The foregoing is provided for purposes of illustrating, explaining, and describing embodiments of the present invention. The specific components and order of the steps listed above, while preferred is not necessarily required. Further modifications and adaptation to these embodiments will be apparent to those skilled in the art and may be made without departing from the scope or spirit of the invention.

I claim:

1. An electronic timing system for timing of athletic events comprising:

one or more radio-frequency identification antennas;

a remote server for collecting and processing timing data;

a portable timing controller having one or more radio-frequency identification readers, a computer electrically coupled to said one or more readers to manage data coming from said one or more readers, a plurality of antenna ports for exchanging data with said one or more radio-frequency identification antennas, input/output means for wirelessly exchanging data with said remote server; and a power control board for accepting and managing electrical power from multiple sources and a disposable radio-frequency identification timing tag that is configured for attachment to an athlete, said timing tag and said antenna having means for wirelessly communicating data between one another.

2. The electronic timing system according to claim 1, wherein the multiple power sources include two or more of either alternating current, direct current or batteries.

3. The electronic timing system according to claim 2, wherein the battery power source includes one or more internal batteries.

4. The electronic timing system according to claim 2, wherein the power control board is programmed to charge the battery power source when it is using the alternating current power source.

5. The electronic timing system according to claim 1, wherein the battery power source includes one or more removable batteries.

6. The electronic timing system according to claim 5, wherein the portable timing controller includes one or more sockets for removably connecting said one or more removable batteries.

7. The electronic timing system according to claim 6, wherein the power control board discharges the one or more removable batteries serially.

8. The electronic timing system according to claim 1, wherein the portable timing controller includes a built-in global positioning system that communicates with GPS satellites to determine the controller's location and time of day to the nearest 100th of a second.

9. The electronic timing system according to claim 1, wherein the portable timing controller includes one or more input/output devices for communicating data from the controller to other remote devices.

10. The electronic timing system according to claim 9, wherein said one or more input/output devices is selected from a group consisting of a built in Ethernet hub having one or more external Ethernet ports for attaching the controller to a network, a cellular modem, a built-in wireless radio transmitter for transmitting data to a wireless network, and one or more USB ports.

11. An electronic timing system for timing of athletic events comprising:

one or more radio-frequency identification antennas;

a remote server for collecting and processing timing data;

a portable timing controller having one or more radio-frequency identification readers, a computer electrically coupled to said one or more readers to manage data coming from said one or more readers, a plurality of antenna ports for exchanging data with said one or more radio-frequency identification antennas, and input/output means for wirelessly exchanging data with said remote server;

a disposable radio-frequency identification timing tag that is configured for attachment to an athlete, said timing tag and said antenna having means for wirelessly communicating data between one another; and a rubberized shell that encases the antenna and allows the routing of cables.

12. The electronic timing system according to claim 11, wherein the rubberized shell includes one or more projections at a first end thereof and one or more indentations at a second end thereof, said projections and indentations corresponding in shape to permit two or more rubberized shells containing antennae to be linked together in a line.

13. The electronic timing system according to claim 11, wherein the plurality of antenna ports first input/output means for exchanging data between the controller and the one or more radio-frequency identification antennas includes means for exchanging data between the controller and two or more radio-frequency identification antennae.

14. The electronic timing system according to claim 13, the plurality of antenna ports first input/output means for exchanging data between the controller and the one or more radio-frequency identification antennas includes means for exchanging data between the controller and eight radio-frequency identification antennae.

15. The electronic timing system according to claim 14, wherein the controller is directly connected to four radio-frequency identification antennae, and each one of said four radio-frequency antennae are connected serially to another radio-frequency antenna.

16. The electronic timing system according to claim 14, wherein the controller is directly connected to two radio-frequency identification antennae, and each one of said four radio-frequency antennae are connected serially to an additional three radio-frequency antennae.

17. The electronic timing system according to claim 14, wherein the controller is directly connected to a radio-frequency identification antenna, and said radio-frequency antenna is connected serially to additional seven radio-frequency antennae.

18. An electronic timing system for timing of athletic events comprising:

a one or more radio-frequency identification antennas;

a remote server for collecting and processing timing data;

a portable timing controller having one or more radio-frequency identification readers, a computer electrically coupled to said one or more readers to manage data coming from said one or more readers, a plurality of antenna ports for exchanging data with said one or more radio-frequency identification antennas, and input/output means for wirelessly exchanging data with said remote server; and a disposable radio-frequency identification timing tag that is configured for attachment to an athlete, said timing tag and said antenna having means for wirelessly communicating data between one another; said timing tag comprising a thin, flexible planar sheet member having a front surface, a rear surface, first and second end sections, and a middle section between said first and second end sections, wherein said planar sheet member may be folded such that the first and second ends thereof are connected to one another and the planar member forms a closed loop for attachment to an athletic shoe between laces and a tongue thereof; and a printed radio frequency identification (RFID) circuit disposed on the middle section of one of said front or rear surfaces of the sheet member, said RFID circuit including an integrated circuit chip positioned near the center of the middle section of the planar sheet member, and a dipole antenna electrically coupled to said integrated circuit chip, wherein a first dipole of the antenna extends generally along a longitudinal axis of the sheet member toward the first end section and a second dipole of the antenna extends generally along the longitudinal axis of the sheet member toward the second end section.

19. The electronic timing system for timing of athletic events according to claim 18, wherein the joined first and second ends of the flexible planar member are positioned between said laces and tongue of said athletic shoe and said RFID circuit on said middle section of the flexible planar member is spaced away from the surface of the athletic shoe.

20. An electronic timing system for timing of athletic events comprising:

one or more radio-frequency identification antennas;

a remote server for collecting and processing timing data;

a portable timing controller having one or more radio-frequency identification readers, a computer electrically coupled to said one or more readers to manage data coming from said one or more readers, a plurality of antenna ports for exchanging data with said one or more radio-frequency identification antennas, and input/output means for wirelessly exchanging data with said remote server; and a disposable radio-frequency identification timing tag that is configured for attachment to an athlete, said timing tag and said antenna having means for wirelessly communicating data between one another; said timing tag comprising a thin, flexible planar sheet member for attachment to a race participant's garments having a front surface for displaying information, and a rear surface; one or more RFID timing tags permanently affixed to said thin, flexible planar sheet member, each one of said one or more RFID timing tags having a rear surface engaging one of either the front surface or rear surface of the thin flexible planar sheet member; and a thermal and moisture resistant layer of material positioned between each one of said plurality of RFID timing tags and said participant's garments.

21. The electronic timing system for timing of athletic events according to claim 20, wherein said one or more RFID timing tags comprise two RFID timing tags spaced a distance apart from one another and positioned in parallel in relation to one another.

* * * * *